US006992986B2

(12) United States Patent
Reza et al.

(10) Patent No.: US 6,992,986 B2
(45) Date of Patent: Jan. 31, 2006

(54) INTEGRATED SELF-OPTIMIZING MULTI-PARAMETER AND MULTI-VARIABLE POINT TO MULTIPOINT COMMUNICATION SYSTEM

(75) Inventors: Majidi-Ahy Reza, Los Altos, CA (US); Joseph Hakim, Sunnyvale, CA (US); Subir Varma, San Jose, CA (US)

(73) Assignee: Aperto Networks, Inc., Milpitas, CA (US)

( * ) Notice: Subject to any disclaimer, the term of this patent is extended or adjusted under 35 U.S.C. 154(b) by 191 days.

(21) Appl. No.: 10/719,891

(22) Filed: Nov. 21, 2003

(65) Prior Publication Data

US 2004/0136400 A1 Jul. 15, 2004

Related U.S. Application Data

(63) Continuation of application No. 09/475,716, filed on Dec. 30, 1999, now Pat. No. 6,654,384.

(51) Int. Cl.
*G01R 31/08* (2006.01)

(52) U.S. Cl. ...................... 370/252; 370/469
(58) Field of Classification Search ................ 370/469, 370/329, 465, 235
See application file for complete search history.

(56) References Cited

U.S. PATENT DOCUMENTS

| 5,546,397 | A | 8/1996 | Mahany |
| 5,546,411 | A | 8/1996 | Leitch et al. |
| 5,553,316 | A | 9/1996 | Diepstraten et al. |
| 5,598,417 | A | 1/1997 | Crisler et al. |
| 5,625,875 | A | 4/1997 | Whinnett et al. |
| 5,666,399 | A | 9/1997 | Bales et al. |
| 5,669,066 | A | 9/1997 | Borg et al. |
| 5,729,531 | A | 3/1998 | Raith et al. |
| 5,808,760 | A | 9/1998 | Gfeller |
| 5,859,839 | A | 1/1999 | Ahlenius et al. |
| 5,896,411 | A | 4/1999 | Ali et al. |
| 6,006,073 | A | 12/1999 | Glauner et al. |
| 6,108,561 | A | 8/2000 | Mallinckrodt |
| 6,236,647 | B1 | 5/2001 | Amalfitano |
| 6,452,915 | B1 | 9/2002 | Jorgensen |
| 6,636,488 | B1 | 10/2003 | Varma |
| 6,643,322 | B1 | 11/2003 | Varma et al. |
| 6,654,384 | B1 * | 11/2003 | Reza et al. ................. 370/469 |

FOREIGN PATENT DOCUMENTS

EP    0 794 631 A2    9/1997

(Continued)

*Primary Examiner*—Chi Pham
*Assistant Examiner*—Prenell Jones
(74) *Attorney, Agent, or Firm*—Swernofsky Law Group PC

(57) ABSTRACT

The invention provides a method and system for adaptive point to multipoint wireless communication. The wireless physical layer and the wireless media-access-control (MAC) layer collectively include a set of parameters, which are adaptively modified by a base station controller for communication with a plurality of customer premises equipment. The base station controller adjusts communication with each customer premises equipment individually and adaptively in response to changes in characteristics of communication, including physical characteristics, amount of communication traffic, and nature of application for the communication traffic.

44 Claims, 1 Drawing Sheet

FOREIGN PATENT DOCUMENTS

| | | |
|---|---|---|
| EP | 0 869 647 A2 | 10/1998 |
| WO | WO 98/59523 A2 | 12/1998 |
| WO | WO 99/18685 A1 | 4/1999 |
| WO | WO 00/13362 A1 | 3/2000 |
| WO | WO 00/22865 A2 | 4/2000 |
| WO | WO 01/50633 A1 | 7/2001 |
| WO | WO 01/50669 A1 | 7/2001 |
| WO | WO 02/05493 A2 | 1/2002 |
| WO | WO 02/13447 | 2/2002 |
| WO | WO 02/25856 A2 | 3/2002 |

* cited by examiner

INTEGRATED SELF-OPTIMIZING MULTI-PARAMETER AND MULTI-VARIABLE POINT TO MULTIPOINT COMMUNICATION SYSTEM

CROSS-REFERENCE TO RELATED APPLICATION

This application is a continuation of U.S. application Ser. No. 09/475,716, filed Dec. 30, 1999, now U.S. Pat. No. 6,654,384.

This application is submitted in the name of the following inventor(s):

| Inventor | Citizenship | Residence City and State |
| --- | --- | --- |
| Reza MAJIDI-AHY | United States | Los Altos, California |
| Joseph HAKIM | Canada | Sunnyvale, California |
| Subir VARMA | United States | San Jose, California |

BACKGROUND OF THE INVENTION

1. Field of the Invention

This invention relates to an adaptive point to multipoint wireless communication system.

2. Related Art

Wireless communication between a sender and a receiver includes sending information using a wireless communication link, in which the sender modulates information onto a wireless communication channel (such as a frequency band reserved for wireless communication between the sender and the receiver), and the receiver demodulates that information from the wireless communication channel, so as to recover the original information.

One problem with known systems is that physical characteristics of the communication link between the sender and receiver can change substantially over relatively short periods of time (for example, the distance between the sender and receiver or the equipment used by the sender or receiver). This is particularly so for interference, such as co-channel interference (CCI), and for multipoint effects, such as reflections resulting in intrasymbol interference and intersymbol interference. Moreover, these physical characteristics can change independently of one another. As a result, selection of a single set of such physical characteristics can result in relatively ineffective or inefficient communication between the sender and the receiver.

Accordingly, it would be advantageous to provide a technique for adaptive point to multipoint wireless communication, in which characteristics of the communication techniques between sender and receiver can be changed adaptively in response to changes in the characteristics of the physical communication media, that is not subject to drawbacks of the known art.

SUMMARY OF THE INVENTION

The invention provides a method and system for adaptive point to multipoint wireless communication. In a preferred embodiment, the wireless physical layer and the wireless media-access-control (MAC) layer collectively include a set of parameters, which are adaptively modified by a base station controller for communication with a plurality of customer premises equipment. In a first aspect of the invention, the wireless transport layer includes a number of provisions, such as adaptive link layer transport services and an advanced TDMA (time division multiple access) protocol. In a second aspect, the base station controller adjusts communication with each customer premises equipment individually and adaptively in response to changes in characteristics of communication, including physical characteristics, amount of communication traffic, and nature of application for the communication traffic. The use of point-to-point multipoint wireless channel provides services over a link whose parameters are continuously adapting to current conditions, on a per-user basis.

The invention provides an enabling technology for a wide variety of applications for communication, so as to obtain substantial advantages and capabilities that are novel and non-obvious in view of the known art. Examples described below primarily relate to a wireless communication system, but the invention is broadly applicable to many different types of communication in which characteristics of the communication link are subject to change.

DETAILED DESCRIPTION OF THE PREFERRED EMBODIMENT

Figure 1:
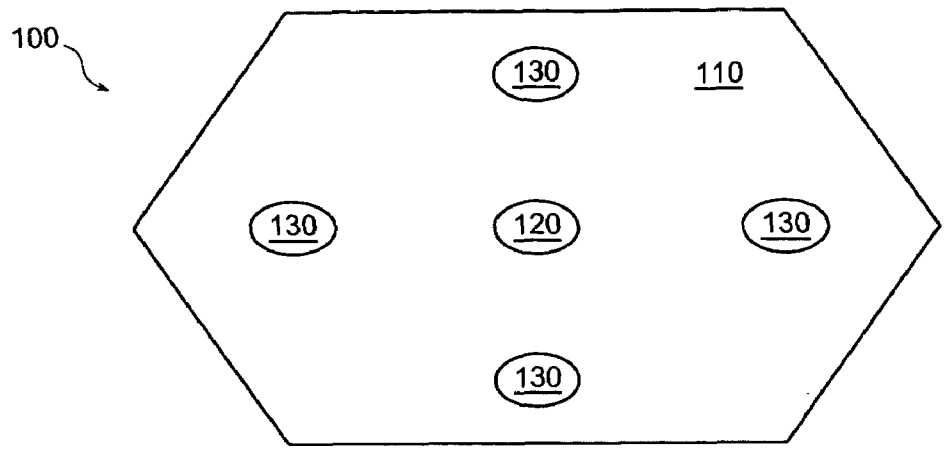
FIG. 1 shows a block diagram of a system using adaptive point to multipoint wireless communication in a wireless communication system.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Application

Inventions described herein can be used in conjunction with inventions described in the following documents.

U.S. patent application Ser. No. 09/475,642, now U.S. Pat. No. 6,650,623, filed Dec. 30, 1999 in the name of Subir Varma, Khuong Ngo, Jean Fuentes, Paul Truong, Reza Majidi-Ahy, titled "Adaptive Link Layer for Point to Multipoint Communication System."

Each of these documents is hereby incorporated by reference as if fully set forth herein. These documents are collectively referred to as the "Incorporated Disclosures".

Lexicography

The following terms refer or relate to aspects of the invention as described below. The descriptions of general meanings of these terms are not intended to be limiting, only illustrative.

base station controller—in general, a device for performing coordination and control for a wireless communication cell. There is no particular requirement that the base station controller must be a single device; in alternative embodiments, the base station controller can include a portion of a single device, a combination of multiple devices, or some hybrid thereof.

communication link—in general, an element for sending information from a sender to a recipient. Although in a preferred embodiment the communication links referred to are generally wireless line of sight point to point communication links, there is no particular requirement that they are so restricted.

customer premises equipment—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

physical parameters—in general, with reference to a wireless communication link, a set of characteristics or parameters relating to physical transmission of information on a communication link. For example, physical characteristics can include (a) a symbol transmission rate, (b) a number of payload data bits assigned per symbol, (c) a number of error detection or correction bits assigned per symbol, and the like.

MAC parameters—in general, with reference to a wireless communication link, a set of characteristics or parameters relating to media access control of a communication link. For example, MAC parameters can include (a) a number of payload data bytes assigned per message, (b) a frequency of acknowledgement messages and a number of message retransmission attempts, (c) a fraction of the communication link allocated to downstream versus upstream communication, and the like.

wireless communication system—in general, a communication system including at least one communication link that uses wireless communication techniques.

wireless transport layer—in general, a set of protocols and protocol parameters for sending and receiving information using wireless transport. In a preferred embodiment, the wireless transport layer is part of a multilayer systems architecture, in which the wireless transport layer is built using a physical transport layer, and the wireless transport layer is used by a logical transport layer such as IP.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

A system using adaptive point to multipoint wireless communication in a wireless communication system operates as part of a system in which devices coupled to a network (such as a computer network) send messages, route and switch messages, and receive messages. In a preferred embodiment, devices coupled to (and integrated with) the network send, route, and receive these messages as sequences of packets, each of which has a header including delivery information and a payload including data. In a preferred embodiment, packet format conforms to the OSI model, in which an application protocol (layer 5, such as FTP), uses a transport protocol (layer 4, such as TCP), which uses a network protocol (layer 3, such as IP), which uses a media access control (MAC) protocol (layer 2), which uses a physical transport technique (layer 1).

The system using adaptive point to multipoint wireless communication is described herein with regard to layer 1 and layer 2, particularly as it applies to interactions between layer 1 and layer 2 and between those layers and layer 3. However, concepts and techniques of the invention are also applicable to other layers of the OSI model. The application gives examples of cases where the type of application in the application layer (layer 5) could be incorporated into embodiments of the invention to improve communication. Adapting those concepts and techniques to such other layers would not require undue experimentation or further invention, and is within the scope and spirit of the invention.

System Elements

FIG. 1 shows a block diagram of a system using adaptive point to multipoint wireless communication in a wireless communication system.

A system 100 includes a wireless communication cell 110, a base station controller 120, and one or more customer premises equipment 130.

The wireless communication cell 110 includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

The base station controller 120 includes a processor, program and data memory, mass storage, and one or more antennas for sending or receiving information using wireless communication techniques.

Similar to the base station controller 120, each customer premises equipment 130 includes a processor, program and data memory, mass storage, and one or more antennas for sending or receiving information using wireless communication techniques.

Communication among devices within the wireless communication cell 110 is conducted on one-to-one basis between each customer premises equipment 130 and the 11 base station controller 120. Thus, the base station controller 120 communicates with each customer premises equipment 130, and each customer premises equipment 130 communicates with the base station controller 120. Customer premises equipment 130 do not communicate directly with other customer premises equipment 130.

Communication between the base station controller 120 and each customer premises equipment 130 is conducted using a time division duplex technique, in which time duration is are divided into individual frames, each one of which includes a "down-stream" portion and an "upstream" portion. Unlike existing protocols in which transmissions are controlled by the transmitting side, the base station controller 120 controls transmissions for both upstream and downstream directions, without specific requests from the customer premises equipment.

During the downstream portion of each frame, the base station controller 120 transmits, thus sending information to one or more customer premises equipment 130. During the upstream portion of each frame, each customer premises equipment 130 is potentially allocated a time slot for transmission, thus for sending information to the base station controller 120. Time division duplex techniques are known in the art of wireless communication.

Adaptive Point to Multipoint Communication

The base station controller 120 maintains a set of physical parameters and MAC parameters for each customer premises equipment 130. In a preferred embodiment, control of each parameter by the base station controller 120 is independent and individual with regard to each customer premises equipment 130. Thus for example, the base station controller 120 determines power level and modulation type for each customer premises equipment 130 without regard to power level and modulation type for any other customer premises equipment 130. Similarly, the base station controller 120 determines power level for a particular customer premises equipment 130 without regard for modulation type for that particular customer premises equipment 130.

However, in alternative embodiments, the base station controller 120 may control multiple parameters in groups, or in a correlated manner. Thus, the base station controller 120 may alternatively determine power level and modulation type for a particular customer premises equipment 130 as a pair of values, where the pair of values are determined so that the optimal pair (rather than optimal individual values) are selected. For example, the base station controller 120 may notice that a particular customer premises equipment 130 needs substantially less transmission power level when using a more robust modulation type, and thus select the power level and modulation type parameters for that particular customer premises equipment 130 jointly so as to be optimal as a pair, rather than as individual values.

In further alternative embodiments, the base station controller 120 may control parameters for multiple customer premises equipment 130 in groups, or in a correlated manner. Thus, the base station controller 120 may alternatively select a group of more than one customer premises equipment 130 and control physical parameters and MAC parameters for the group as a whole, where the parameters are determined so as to be optimal for the group, rather than for individual customer premises equipment 130. For example, the base station controller 120 may notice that two customer premises equipment 130 A and B generate substantial co-channel interference, and therefore set the channel selection parameters for those two customer premises equipment 130 A and B to avoid that co-channel interference.

As a further alternative embodiment of controlling parameters for multiple customer premises equipment 130 in groups, the base station controller 120 may control parameters so that (for a group of N customer premises equipment 130), some portion M of those customer premises equipment 130 have a first set of parameters, while some other portion (N−M) of those customer premises equipment 130 have a second set of parameters, so that communication with the entire group of N customer premises equipment 130 is optimal. For example, the base station controller 120 may determine, for N=10 customer premises equipment 130, that M=9 of those customer premises equipment 130 communicate with the base station controller 120 at 20 megasymbols per second, while the remaining (N−M)=1 of those customer premises equipment 130 communicate with the base station controller 120 at 5 megasymbols per second, so that allocated resources are minimized for communication with the entire group of N=10 customer premises equipment 130.

In a preferred embodiment, each of the following parameters actually has two values: a first value for transmission by the base station controller 120 and a second value for transmission by the customer premises equipment 130.

Thus, the base station controller 120 can transmit using a first set of parameters while the customer premises equipment 130 is instructed to transmit using a second set of parameters. There is no particular requirement that the first set of parameters and the second set of parameters need be correlated, except for optimizations desirable due to the nature of the communication link between the base station controller 120 and the customer premises equipment 130.

In alternative embodiments, the optimizations selected by the base station controller 120 may be responsive to optimizations or requirements imposed by higher levels in the OSI model. For example, there are instances noted below in which, if the application level is transmitting voice information or other streaming media, a first set of parameters would be considered optimal; while if the application level is transmitting file data or other relatively cohesive information, a second set of parameters would be considered optimal.

In a preferred embodiment, physical parameters and MAC parameters include the following physical parameters:

antenna selection—The base station controller 120 includes more than one antenna, and each customer premises equipment 130 includes one or more antennas. In a preferred embodiment, the antenna selection parameter includes a choice of which one antenna at the base station controller 120 and which one antenna at the each customer premises equipment 130.

In alternative embodiments, the antenna selection parameter includes the possibility of sending portions of communication signal from each of a plurality of antennas (thus, either simultaneously sending from two antennas or sending from one antenna followed by a second antenna) and similarly receiving portions of communication signal at each of a plurality of antennas.

power level—The base station controller 120 sets the power allocated for transmission.

channel selection—The communication link includes more than one frequency channel on which transmissions are sent and received. In a preferred embodiment, the channel selection parameter includes a choice of which one channel the base station controller 120 uses to transmit and which one channel the each customer premises equipment 130 transmit.

Similar to antenna selection, in alternative embodiments, the channel selection parameter includes the possibility of sending portions of communication signal from each of a plurality of channels (thus, either simultaneously sending from two channels or sending from one channel followed by a second channel) and similarly receiving portions of communication signal at each of a plurality of channels.

In alternative embodiments, the communication link may include other types of channel other than frequency division (FDMA), such as spread spectrum code division (CDMA), or some combination of transmission separation techniques, such as a combination of CDMA, FDMA, and TDMA techniques. In such alternative embodiments, the channel selection parameter includes the possibility of selecting one or more of such separation techniques either independently or jointly.

modulation type—The base station controller 120 and the customer premises equipment 130 can exchange information at one of a number of different bit per symbol rates, as determined by the modulation type for transmission of information. In a preferred embodiment, the modulation type parameter selects between QPSK, 16

QAM, and 64 QAM modulation techniques. When the modulation type is QPSK, two bits are transmitted for each symbol. Similarly, when the modulation type is 16 QAM, four bits are transmitted for each symbol, and when the modulation type is 64 QAM, six bits are transmitted for each symbol.

In alternative embodiments, the modulation type may include other techniques for modulation, such as QFSK or other frequency modulation techniques, spread spectrum modulation techniques, or some combination thereof.

symbol rate—The base station controller 120 and the customer premises equipment 130 can exchange information at one of a number of different symbol per second rates, as determined by the symbol rate for transmission of information. In a preferred embodiment, the symbol rate parameter selects between transmission rates of five, ten, or twenty megasymbols per second.

error code type—The base station controller 120 and the customer premises equipment 130 can exchange information using one of a number of different error detection and correction techniques. These error detection and correction techniques can include past error detection and correction and forward error detection and correction. Various codes and techniques for error detection and correction are known in the art of information science. In a preferred embodiment, the error code type parameter selects between Reid-Solomon codes encoding N payload bits using a block of M transmitted bits, where M is greater than or equal to N.

equalization—When base station controller 120 and the customer premises equipment 130 exchange information, the communication link between the two imposes an impulse response, so that a signal which is transmitted from the sender to the receiver is transformed in a substantially nonlinear manner. The impulse response is primarily due to multipath effects of communication between the sender and receiver, but can also be due to other frequency-diverse effects such as weather.

In a preferred embodiment, the base station controller 120 and the customer premises equipment 130 include an equalizer element, which attempts to invert the impulse response of the communication link by pre-conditioning the signal before transmission. The equalizer element includes a sequence of coefficients for use in a finite impulse response (FIR) filter, or may include a sequence of coefficients for use in a polynomial for determining values for an infinite impulse response (IIR) filter. The equalization parameter thus includes the sequence of coefficients for the filter used for pre-conditioning the signal before transmission.

In a preferred embodiment, physical parameters and MAC parameters include the following MAC parameters:

message size—As described in the Incorporated Disclosures, the base station controller 120 and the customer premises equipment 130 exchange information using (downstream or upstream) payload elements, each of which includes header information and payload information. The message size parameter includes a value for the amount of payload information to be included in each payload element; this value can vary from a relatively small number of payload bytes to the maximum number of payload bytes allowed by the network (layer 2) protocol, typically about 1500.

In a preferred embodiment, the message size parameter is primarily responsive to the bit error rate (BER) experienced for the communication link between the base station controller 120 and the customer premises equipment 130. When the bit error rate is relatively small, the message size parameter can be set to be relatively large, so as to reduce the amount of overhead for header information in each payload element. However, when the bit error rate is relatively larger, the message size parameter can be set to be relatively smaller, so as to reduce the amount of overhead for lost payload elements due to errors in one or more symbols of transmitted payload elements.

Those skilled in the art will recognize, after perusal of this application, that there is a relationship between the modulation type, error code type, and message size. Thus, where the modulation type allocates relatively fewer bits per symbol, the likelihood of error for any particular symbol is relatively lower, and the bit error rate will also be relatively lower. Similarly, where the error code type allocates relatively more error detection or correction bits per symbol, the likelihood of error for a particular symbol is also relatively lower, and the bit error rate will also be relatively lower. In those cases where the bit error rate is relatively lower, the message size parameter can be set to a relatively larger value.

acknowledgment and retransmission—As described in the Incorporated Disclosures, the base station controller 120 and the customer premises equipment 130 exchange information using acknowledgment (ARQ) messages, so as to indicate to the sender whether or not the receiver has accurately received any particular payload element. If a particular payload element is not received, the sender can decide to retransmit that payload element a number of times, so as to attempt to having received correctly. The acknowledgment parameter selects how frequently acknowledgment messages are used to reply to payload elements, and thus how frequently to let the sender know whether those payload elements have been received. Similarly, the retransmission parameter selects how persistently the sender will attempt to send or resend payload elements to the receiver.

Those skilled in the art will recognize, after perusal of this application, that there is a relationship between the application in use by the layer 5 application protocol and the choice of acknowledgment and retransmission parameters. For example, where the application includes voice transmission or other streaming media, there is little value in retransmitting any particular payload element, as the time for decoding and presenting that payload element is usually well passed by the time that particular payload element can be retransmitted by the sender and received by the receiver. On the contrary, for example, where the allocation includes file data transfer, there is relatively greater value in retransmitting each lost payload element, as each and every payload element is generally required for useful reception of the entire file data transfer.

TDD duty cycle—As described in the Incorporated Disclosures, the base station controller 120 and the customer premises equipment 130 exchange information using a downstream portion and an upstream portion of a TDMA transmission frame. The TDD duty cycle parameter selects how much of the TDMA transmission frame is allocated for downstream information transfer and how much of the team a transmission frame is allocated for upstream information transfer.

As describe below, the base station controller 120 maintains these physical parameters and MAC parameters, and adaptively modifies them with changing conditions on the communication link between the base station controller 120 and the customer premises equipment 130. Thus, when the base station controller 120 notices a change in characteristics of the communication link, it does not immediately alter the physical parameters and MAC parameters to correspond exactly to the new characteristics of the communication link. Rather, the base station controller 120 maintains a sequence (of at least one) past sets of values of these parameters, and modifies the most recent set of parameters using the new characteristics, so as to adjust the set of parameters dynamically while allowing sets of values of these parameters to have persistent effect on future values.

In a preferred embodiment, the base station controller 120 records each current value for the physical parameters and MAC parameters, determines exact values for the physical parameters and MAC parameters in response to characteristics of the communication link, and adaptively selects new values for the physical parameters and MAC parameters (thus, for the next TDMA frame) by linearly mixing current values with dynamic values. Operation of this technique is shown in the following equation 140:

$$\text{value}_{new} \leftarrow 1-\text{alpha}*\text{value}_{current}+\text{alpha}*\text{value}_{exact} \tag{140}$$

where $\text{value}_{new}$=the new value of each parameter, for the next TDMA frame;

$\text{value}_{current}$=the current value of each parameter, for the most recent TDMA frame;

$\text{value}_{exact}$=the dynamic exact value of each parameter, determined in response to characteristics of the communication link;

and alpha=a hysteresis parameter for determining how fast to respond to changes in characteristics of the communication link.

In a preferred embodiment, the value of alpha is specific to each individual physical parameter and MAC parameter.

Method of Operation

Figure 2:
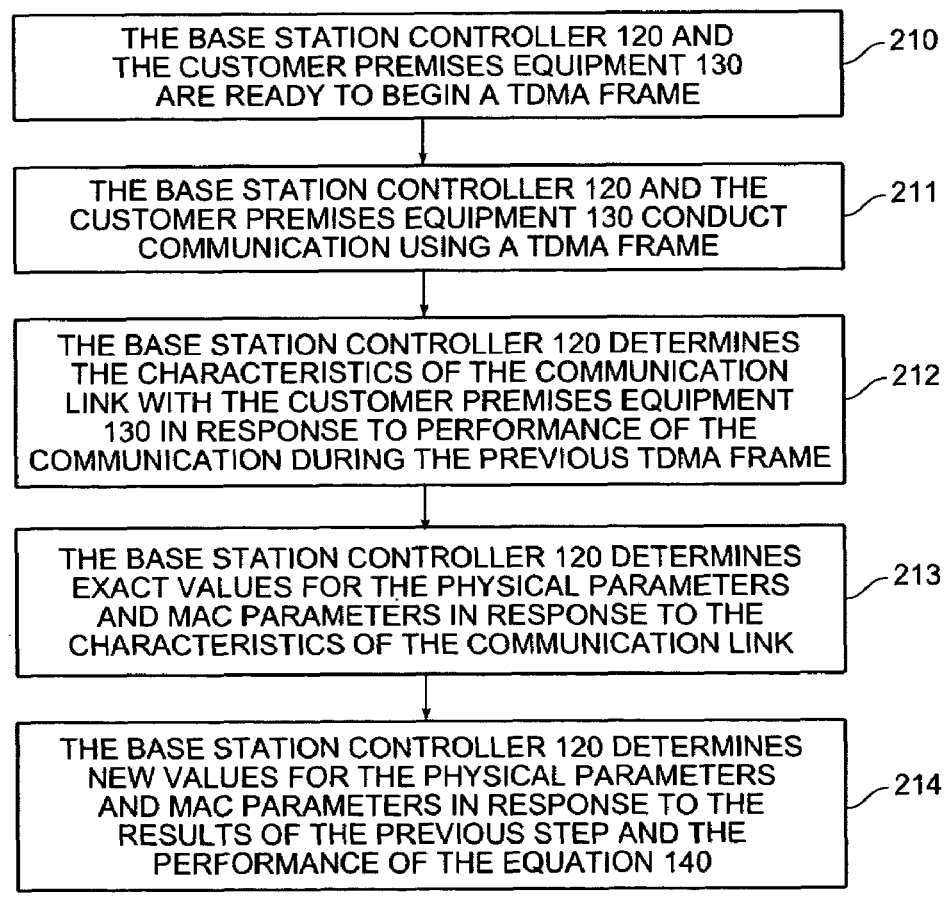
FIG. 2 shows a process flow diagram of a method for operating a system using adaptive point to multipoint wireless communication in a wireless communication system.

FIG. 2 shows a process flow diagram of a method for operating a system using adaptive point to multipoint wireless communication in a wireless communication system.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the base station controller 120 and the customer premises equipment 130 are ready to begin a TDMA frame.

At a step 211, the base station controller 120 and the customer premises equipment 130 conduct communication using a TDMA frame. As part of this step, the base station controller 120 directs the customer premises equipment 130 regarding which physical parameters and MAC parameters to use.

At a step 212, the base station controller 120 determines characteristics of the communication link with the customer premises equipment 130, in response to performance of the communication during the previous TDMA frame.

At a step 213, the base station controller 120 determines exact values for the physical parameters and MAC parameters in response to characteristics of the communication link.

At a step 214, the base station controller 120 determines new values for the physical parameters and MAC parameters in response to results of the previous step, and performance of the equation 140.

After this step, the base station controller 120 and the customer premises equipment 130 have performed one sending and receiving information using a TDMA frame. The flow point 310 is reached repeatedly and the steps thereafter are performed repeatedly, for each TDMA frame.

Generality of the Invention

The invention has general applicability to various fields of use, not necessarily related to the services described above. For example, these fields of use can include one or more of, or some combination of, the following:

The invention is applicable to other forms of wireless communication, such as frequency division multiple access (FDMA) or code division multiple access (CDMA, also known as spread spectrum communication);

The invention is applicable to wireline (that is, non-wireless) communication, in which now can be achieved from dynamically adjusting communication parameters, such as physical parameters or MAC parameters. For example, the invention can be generalized to wireline communication using modems in which equalization parameters are to be dynamically adjusted.

The invention is applicable to other wireless communication systems, such as satellite communication systems and (microwave tower or other) point to point transmission systems.

The invention is applicable to both fixed wireless communication systems, in which customer premises equipment do not move relative to the base station controller 120, and to mobile wireless communication systems, and which customer premises equipment move substantially relative to the base station controller 120.

Other and further applications of the invention in its most general form, will be clear to those skilled in the art after perusal of this application, and are within the scope and spirit of the invention.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A method, including steps of
   determining current first values for a plurality of first parameters and at least one second parameter for a communication link, said first parameters being associated with a first layer of an OSI model communication system and said second parameter being associated with a second layer of the OSI model communication system;
   sending first information using said current first values;
   obtaining second information regarding characteristics of said communication link in response to a result of said steps of sending;

determining dynamic exact first values for the plurality of the parameters in response to the characteristics of said communication link; and adjusting a plurality of first values for the plurality of the parameters in conjunction in response to said second information, said step of adjusting comprising linearly mixing each current first value for the plurality of the parameters with a corresponding dynamic exact first value, whereby further use of said communication link is responsive to said steps of adjusting.

2. A method as in claim 1, wherein said first layer and said second layer are selected from the group: a physical layer, a media access layer, a network layer, a transport layer, an application layer.

3. A method as in claim 1, wherein said first parameters include at least two of: an antenna selection value, a power level value, a channel selection value, a modulation type value, a symbol rate value, an error code type value, a set of equalization values.

4. A method as in claim 1, wherein said second parameters include at least one of: a payload element size, a message size value, a set of acknowledgment and retransmission values, a TDD duty cycle value.

5. A method as in claim 1, wherein said steps of adjusting include steps of dynamically selecting a set of altered first values in response to said second information, said set of altered first values including at least two changes to said first parameters and said second parameters, said set of altered first values having been determined to be superior to altered first values having only one change to said first parameters and said second parameters.

6. A method as in claim 1, wherein said communication link is subject to at least one of: interference effects, multipath effects, both interference effects and multipath effects.

7. A method as in claim 1, wherein said communication link includes a wireless communication link.

8. A method as in claim 1, wherein said communication link includes a plurality of distinguishable channels, said channels being distinguished using a plurality of: frequency division, time division, space division, spread spectrum code division.

9. A method as in claim 1, wherein said communication link includes a plurality of distinguishable channels, said channels being distinguished using at least one of: frequency division, time division, space division, spread spectrum code division.

10. A method as in claim 1, wherein said steps of adjusting are responsive to a type of protocol being used by at least one of the group: a physical layer, a media access layer, a network layer, a transport layer, an application layer.

11. A method as in claim 10, wherein said steps of adjusting are responsive to whether an application layer protocol is for asymmetric transfer of information.

12. A method as in claim 10, wherein said steps of adjusting are responsive to whether an application layer protocol is for sending voice or video information.

13. A base station controller comprising:

a processor that controls sending and receiving information over a communication link responsive to at least first parameters associated with a first layer of OSI model communication system and one or more second parameters associated with a second layer of the OSI model communication system; and a memory that stores instructions, the memory being coupled to the processor, the instructions, when executed by the processor, cause the processor to perform steps of:

determining current first values for a plurality of the first parameters and the one or more second parameters for the communication link;

sending first information using said current first values;

obtaining second information regarding characteristics of said communication link in response to a result of said step of sending;

determining dynamic exact first values for the parameters in response to the second information; and adjusting a plurality of first values for the parameters, said step of adjusting comprising linearly mixing each current first value with a corresponding dynamic exact first value, whereby further use of said communication link is responsive to said step of adjusting.

14. A base station controller as in claim 13, wherein said first layer and said second layer are selected from the group of a physical layer, a media access layer, a network layer, a transport layer, and an application layer.

15. A base station controller as in claim 13, wherein said first parameters comprise at least two parameters selected from the group of an antenna selection parameter, a power parameter, a channel selection parameter, a modulation type parameter, a symbol rate parameter, an error code type parameter, and a set of equalization parameters.

16. A base station controller as in claim 13, wherein said one or more second parameters comprise at least one parameter selected from the group of a payload element size parameter, a message size parameter, a set of acknowledgment and retransmission parameters, and a TDD duty cycle parameter.

17. A base station controller as in claim 13, wherein said communication link includes a plurality of distinguishable channels, said channels being distinguished using at least two kinds of multiple access selected from the group of frequency division, time division, space division, and spread spectrum code division.

18. A base station controller as in claim 13, wherein said communication link includes a plurality of distinguishable channels, said channels being distinguished using at least one kind of multiple access selected from the group of frequency division, time division, space division, and spread spectrum code division.

19. A base station controller as in claim 13, wherein said step of adjusting is responsive to a type of protocol being used by at least one layer selected from the group of a physical layer, a media access layer, a network layer, a transport layer, and an application layer.

20. A base station controller as in claim 19, wherein said step of adjusting is responsive to whether an application layer protocol is for asymmetric transfer of information.

21. A base station controller as in claim 19, wherein said step of adjusting is responsive to whether an application layer protocol is for sending voice or video information.

22. An article of manufacture comprising a memory storing a set of instructions that, when executed by a processor that controls sending and receiving information over a communication link responsive to at least first parameters associated with a first layer of OSI model communication system and one or more second parameters associated with a second layer of the OSI model communication system, cause the processor to perform steps of:

determining current first values for a plurality of the parameters for the communication link;

sending first information using said current first values;

obtaining second information regarding characteristics of said communication link in response to a result of said step of sending;

determining dynamic exact first values for the plurality of the parameters in response to the second information; and adjusting the plurality of the parameters, said step of adjusting comprising linearly mixing each current first value with a corresponding dynamic exact first value, whereby further use of said communication link is responsive to said step of adjusting.

23. An article of manufacture according to claim 22, wherein said first layer and said second layer are selected from the group of a physical layer, a media access layer, a network layer, a transport layer, and an application layer.

24. An article of manufacture according to claim 22, wherein said first parameters comprise at least two parameters selected from the group of an antenna selection parameter, a power level parameter, a channel selection parameter, a modulation type parameter, a symbol rate parameter, an error code type parameter, and a set of equalization parameters.

25. An article of manufacture according to claim 22, wherein said one or more second parameters comprise at least one parameter selected from the group of a payload element size parameter, a message size parameter, a set of acknowledgment and retransmission parameters, and a TDD duty cycle parameter.

26. An article of manufacture according to claim 22, wherein said communication link includes a wireless communication link.

27. An article of manufacture according to claim 22, wherein said communication link includes a plurality of distinguishable channels, said channels being distinguished using at least two kinds of multiple access selected from the group of frequency division, time division, space division, and spread spectrum code division.

28. An article of manufacture according to claim 22, wherein said communication link includes a plurality of distinguishable channels, said channels being distinguished using at least one kind of multiple access selected from the group of frequency division, time division, space division, and spread spectrum code division.

29. An article of manufacture according to claim 22, wherein said step of adjusting is responsive to a type of protocol being used by at least one layer selected from the group of a physical layer, a media access layer, a network layer, a transport layer, and an application layer.

30. An article of manufacture according to claim 29, wherein said step of adjusting is responsive to whether an application layer protocol is for asymmetric transfer of information.

31. An article of manufacture according to claim 29, wherein said step of adjusting is responsive to whether an application layer protocol is for sending voice or video information.

32. A method of self-optimizing point to multipoint communication, the method including steps of:
determining current values for a plurality of parameters for a communication link;
determining characteristics of said communication link;
determining exact values corresponding to said characteristics of said communication link; and
determining new values for said plurality of parameters based on differences between said current values and said exact values using hysteresis parameters applied to said differences;
whereby said current values have a persistent effect on said new values.

33. A method as in claim 32, wherein in said step of determining new values, said differences are multiplied by said hysteresis parameters.

34. A method as in claim 32, wherein said parameters are associated with layers of an OSI model communication system.

35. A method as in claim 34, wherein said layers are selected from the group: a physical layer, a media access layer, a network layer, a transport layer, an application layer.

36. A method as in claim 32, wherein said parameters include at least two of: an antenna selection value, a power level value, a channel selection value, a modulation type value, a symbol rate value, an error code type value, a set of equalization values.

37. A method as in claim 32, wherein said parameters include at least one of: a payload element size, a message size value, a set of acknowledgment and retransmission values, a TDD duty cycle value.

38. A method as in claim 32, wherein said communication link is subject to at least one of: interference effects, multipath effects, both interference effects and multipath effects.

39. A method as in claim 32, wherein said communication link includes a wireless communication link.

40. A method as in claim 32, wherein said communication link includes a plurality of distinguishable channels, said channels being distinguished using a plurality of: frequency division, time division, space division, spread spectrum code division.

41. A method as in claim 32, wherein said communication link includes a plurality of distinguishable channels, said channels being distinguished using at least one of: frequency division, time division, space division, spread spectrum code division.

42. A method as in claim 32, wherein said method is responsive to a type of protocol being used by at least one of the group: a physical layer, a media access layer, a network layer, a transport layer, an application layer.

43. A method as in claim 32, wherein said method is responsive to whether an application layer protocol is for asymmetric transfer of information.

44. A method as in claim 32, wherein said method is responsive to whether an application layer protocol is for sending voice or video information.

* * * * *